(12) United States Patent
Özden et al.

(10) Patent No.: US 12,447,929 B2
(45) Date of Patent: Oct. 21, 2025

(54) CAR OUTER WAIST BELT SYSTEM WITH CAMERA INTEGRATION

(71) Applicant: STANDARD PROFIL EGE OTOMOTIV SANAYI VE TICARET ANONIM SIRKETI, Istanbul (TR)

(72) Inventors: Murat Can Özden, Düzce (TR); Orçun Saf, Istanbul (TR)

( * ) Notice: Subject to any disclaimer, the term of this patent is extended or adjusted under 35 U.S.C. 154(b) by 0 days.

(21) Appl. No.: 18/560,958

(22) PCT Filed: Feb. 1, 2022

(86) PCT No.: PCT/TR2022/050087
§ 371 (c)(1),
(2) Date: Nov. 15, 2023

(87) PCT Pub. No.: WO2023/055315
PCT Pub. Date: Apr. 6, 2023

(65) Prior Publication Data
US 2024/0253598 A1   Aug. 1, 2024

(30) Foreign Application Priority Data
Sep. 30, 2021   (TR) ................ 2021/015303

(51) Int. Cl.
*B60S 1/04*   (2006.01)
*B60R 1/26*   (2022.01)
*B60S 1/34*   (2006.01)

(52) U.S. Cl.
CPC .............. *B60S 1/0491* (2013.01); *B60R 1/26* (2022.01); *B60S 1/3415* (2013.01)

(58) Field of Classification Search
CPC ..... B60R 1/26; B60R 2011/004; B60R 11/04; B60Q 1/2684; B60S 1/58; B60S 1/0491; B60S 1/3415; B60S 1/583
See application file for complete search history.

(56) References Cited

U.S. PATENT DOCUMENTS

| 2017/0151933 A1 | 6/2017 | Doorley et al. |
| 2019/0143899 A1 | 5/2019 | Kosidlo et al. |

(Continued)

FOREIGN PATENT DOCUMENTS

| KR | 20200143840 A | 12/2020 |
| WO | 2019038076 A1 | 2/2019 |

OTHER PUBLICATIONS

International Search Report for corresponding PCT/TR2022/050087 dated May 20, 2022.

(Continued)

*Primary Examiner* — Farzana Hossain
(74) *Attorney, Agent, or Firm* — Egbert, McDaniel & Swartz, PLLC

(57) ABSTRACT

Disclosed is a vehicle outer waist belt for use in motor vehicles. The system includes an outer glass sealing element that seals between the inner environment of the vehicle and the outer environment of the vehicle, at least one reservoir on the outer glass sealing element, a camera that provides instantaneous display of the traffic status behind the vehicle in the reservoir, a side signal light compartment made of transparent thermoplastic elastomer (TPE) material that provides the return signal of the vehicle in the reservoir, an upper cover closed on the reservoir and sealing the camera, a conductive polymer with high electrical conductivity that provides the electrical connection of the camera and the side signal light compartment, and a display that allows the driver to see the instantaneous images transferred from the camera inside the vehicle.

3 Claims, 1 Drawing Sheet

(56) References Cited

U.S. PATENT DOCUMENTS

2020/0139799 A1    5/2020  Blottiau et al.
2022/0305993 A1*   9/2022  Scott-Collins ............ B60R 1/06

OTHER PUBLICATIONS

Written Opinion of the International Searching Authority for corresponding PCT/TR2022/050087 dated May 20, 2022.

* cited by examiner

CAR OUTER WAIST BELT SYSTEM WITH CAMERA INTEGRATION

TECHNICAL FIELD OF THE INVENTION

The invention relates to a vehicle outer waist belt system with a camera-integrated translucent thermoplastic elastomer (TPE) signal region for use in motor vehicles.

In particular, the invention relates to a vehicle outer waist belt system with a transparent thermoplastic elastomer (TPE) signal zone and integration of a camera that allows the driver to observe the traffic situation with the outer glass sealing element that seals the vehicles.

PRESENT STATE OF THE ART

Vehicle side outer imaging systems and outer glass sealing systems are used to perform individual functions in the present art. The side outer imaging systems in the vehicles mainly consist of an external imaging system (camera) mounted on the vehicle doors and a display in which the images obtained by said imaging system are transferred to the vehicle interior environment. Outer glass sealing systems include elements in which polymer-based materials are designed in a structure suitable for sealing conditions. These sealing elements provide insulation of the interior environment by removing the relationship between the glass and the outer environment.

Vehicle side outer imaging systems and outer glass sealing systems perform their own individual functions and are mounted on the vehicle separately. Processing is carried out on the door metals for mounting the imaging systems to the door assembly. In addition, the outer coating parts of the imaging system are formed by mounting more than one plastic material to each other. There was a need for systems integrated with the imaging system on outer glass sealing systems in the known state of the art for this reason.

Patent Application No. KR20200143840 may be shown as an example of the state of the art as a result of the research conducted on the literature. The said document relates to a side camera for the vehicle that allows the user to control a blind spot while driving with a camera attached to the left and right door panels for safe driving.

The said invention refers to a side camera comprising a camera body attached to the edge of the fender adjacent to the door panel of the vehicle, a cable taken under the camera body and entering between the fender and the door panel without being exposed to the outside and a camera module attached to the camera body. Thus, a camera that is attached externally to the door panel without being integrated into any sealing element is introduced on the vehicle in the said invention.

Patent Application No. US20200139799 may be shown as another example of the state of the art as a result of the research conducted on the literature. The said document relates to a motor vehicle sealing module. The sealing module comprises at least one long profile and at least one gasket configured to work with a glass of the vehicle. Furthermore, the said profile has a support to support at least one electronic equipment, such as a camera. However, the sealing module does not have a translucent material in the signal region and a polymer material with electrical conductivity in the electrical transmission.

Consequently, the foregoing problems and insufficient solutions thereof require making an improvement in the related technical field.

OBJECT OF THE INVENTION

The present invention relates to a camera-integrated vehicle outer waist belt system which eliminates the foregoing disadvantages and offers novel advantages to the related technical field.

The main object of the invention is to provide a system that integrates and uses the camera that allows the driver to observe the traffic situation with the outer glass sealing element that seals the vehicles.

The object of the invention is to reduce the assembly workmanship used in the assembly of two different main assemblies in the vehicle assembly line by eliminating the need for more than one plastic closure parts thanks to the integration of the imaging system on the sealing element.

Another object of the invention is to ensure that the imaging system and also the vehicle signaling system are carried out by a single manufacturing process in a reservoir on the outer glass sealing element.

Another object of the invention is to minimize the wind noise, which is one of the vehicle noise sources, and to provide NVH (Noise, Vibration & Harshness) feature in the vehicle by manufacturing the vehicle signal system from translucent thermoplastic elastomer (TPE) material and the reservoir containing the said signal system and the imaging system in accordance with the operating conditions.

Another object of the invention is to reduce the number of parts by increasing the production efficiency with a single process in manufacturing by performing the imaging system and signal system connections with polymer material with electrical conductivity instead of electronic fittings.

The invention relates to a vehicle outer waist belt system used in motor vehicles in order to fulfill all the purposes that may arise from the above-mentioned and detailed description, characterized in that it comprises the following elements:

- the outer glass sealing element that seals between the interior and the outer of the vehicle,
- at least one reservoir on the outer glass sealing element in one piece,
- camera for instantaneous display of the traffic situation behind the vehicle in the reservoir,
- a side signal light compartment made of translucent Thermoplastic Elastomer (TPE) material that provides the return signal of the vehicle in the reservoir,
- the upper cover, which is closed on the reservoir and seals the camera,
- conductive polymer having high electrical conductivity for power transmission providing electrical connection of camera and side signal light compartment,
- display that allows the driver to see the snapshots transferred from the camera in the vehicle.

The structural and characteristic features and all the advantages of the invention will be understood more clearly by reference to the following figures and the detailed explanation thereof. Therefore, the evaluation should be made by taking these figures and detailed explanations into consideration.

FIGURES FOR A BETTER UNDERSTANDING OF THE INVENTION

LIST OF THE REFERENCE NUMBERS

10. Outer glass sealing element
20. Reservoir
30. Camera
40. Side signal light compartment
50. Upper cover
60. Conductor polymer
70. Display

DETAILED DESCRIPTION OF THE INVENTION

The preferred alternatives of the vehicle outer waist belt system of the present invention are merely explained for a better understanding of the subject of the present invention, which is not intended to be limiting in any way in this detailed description.

Figure 1:
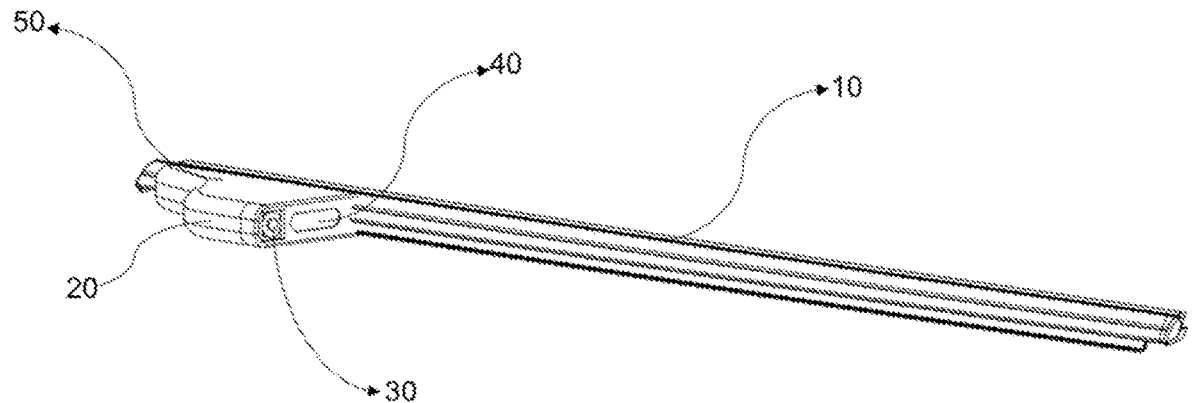
FIG. 1 is a representative perspective view of the vehicle outer waist belt system of the invention.

The representative view of the vehicle outer waist belt system of the invention is given in FIG. 1. Accordingly, the vehicle outer waist belt system in its most basic form comprises an outer glass sealing element (10) that seals between the inner environment of the vehicle and the outer environment of the vehicle, at least one reservoir (20) on the outer glass sealing element (10), the camera (30) that provides instantaneous display of the traffic status behind the vehicle in the reservoir (20), the side signal light compartment (40) that provides the return signal of the vehicle in the reservoir (20), the upper cover (50) closed on the reservoir (20), the conductive polymer (60) that provides the electrical connection of the camera (30) and the side signal light compartment (40), the display (70) that allows the driver to see the images transferred from the camera (30).

The outer glass sealing element (10), which forms the main structure of the vehicle outer waist belt system, is made of polymer material and has a reservoir (20) on it. The outer glass sealing element (10) and the reservoir (20) are in one piece. The reservoir (20) has been designed in accordance with NVH (Noise, Vibration & Harshness) performance, taking into account the operating conditions of the vehicle. Thus, the wind noise, which is one of the vehicle noise sources, is minimized.

The reservoir (20) comprises at least one camera (30) for instantaneous display of the traffic situation behind the vehicle and a side signal light compartment (40) for transmitting the return signal of the vehicle. The side signal light compartment (40) is made of translucent Thermoplastic Elastomer (TPE) material.

An upper cover (50) is sealed on the reservoir (20) to protect the camera (30) from external factors in the reservoir (20).

The electrical connection of the camera (30) and the side signal light compartment (40) in the reservoir (20) with the vehicle is provided by means of a conductive polymer (60) having high electrical conductivity for power transmission.

Figure 2:
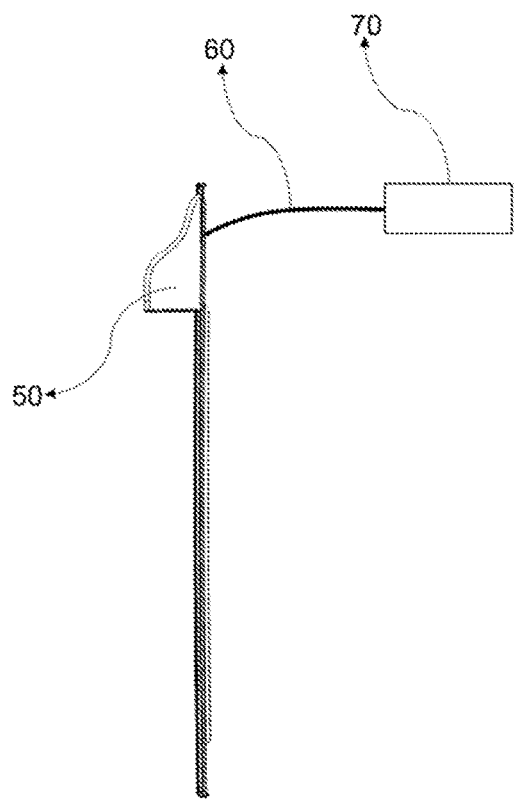
FIG. 2 is the subject of the invention is the representative upper view of the vehicle outer waist belt system.

Snapshots of the traffic situation behind the vehicle provided with the camera (30) are seen by the driver through the display (70) placed in the vehicle as seen in FIG. 2.

The use of the vehicle outer waist belt system of the invention is as follows;

The outer glass sealing element (10), which is in one piece with the reservoir (20), is mounted on the vehicle. The electrical connections of the camera (30) and the side signal light compartment (40) are completed by means of a conductive polymer (60). The display (70) is placed in the vehicle. The vehicle's direction of rotation signal is given by the side signal light compartment (40) and the snapshots of the traffic situation behind the vehicle provided with the camera (30) are monitored by the driver through the display (70) during the use of the vehicle.

The invention claimed is:

1. An exterior wiper blade system for use in a motor vehicle, the exterior wiper blade system comprising:
    an exterior glass sealing element adapted to seal between an interior of the vehicle and an exterior of the vehicle;
    at least one reservoir on said exterior glass sealing element;
    a camera for providing images of a traffic situation behind the vehicle, said camera being in said at least one reservoir;
    a side signal light compartment formed of a translucent thermoplastic elastomer, said side signal light compartment providing a return signal of the vehicle in the at least one reservoir;
    an upper cover that is closed on said at least one reservoir so as to seal said camera;
    a conductive polymer electrically connected to said camera and to said side signal light compartment, said conductive polymer having high electrical conductivity; and
    a display connected to said camera, said display displaying the images transferred from said camera in the vehicle to a driver of the vehicle.

2. The exterior wiper blade system of claim 1, wherein said exterior glass sealing element is formed of a polymeric material.

3. The exterior wiper blade system of claim 1, wherein said at least one reservoir is formed of polymeric material.

* * * * *